United States Patent [19]

Morin

[11] Patent Number: 5,662,051
[45] Date of Patent: Sep. 2, 1997

[54] METHOD OF TREATING SOLID RESIDUE RESULTING FROM COMBUSTION OF A SULFUR-CONTAINING FUEL, AND HEAT TREATMENT APPARATUS FOR IMPLEMENTING THE METHOD

[75] Inventor: Jean-Xavier Morin, Neuville Aux-Bois, France

[73] Assignee: GEC Alsthom Stein Industrie, Velizy-Villacoublay, France

[21] Appl. No.: 416,974

[22] Filed: Apr. 5, 1995

[30] Foreign Application Priority Data

Apr. 13, 1994 [FR] France .................................. 94 04398

[51] Int. Cl.$^6$ .................................................. F23J 3/00
[52] U.S. Cl. ........................ 110/344; 110/234; 110/347; 110/165 R; 423/244.07; 122/4 D
[58] Field of Search ...................... 110/165 R, 245, 110/259, 266, 344, 345, 347, 348; 422/142, 144; 423/242.2, 244.05, 244.07; 122/4 D

[56] References Cited

U.S. PATENT DOCUMENTS

| 4,197,285 | 4/1980 | Yang et al. . | |
|---|---|---|---|
| 4,281,605 | 8/1981 | Uemura et al. | 110/165 R |
| 4,329,324 | 5/1982 | Jones . | |
| 5,163,374 | 11/1992 | Rehmat et al. | 110/245 X |
| 5,216,966 | 6/1993 | Martin | 110/345 X |
| 5,345,883 | 9/1994 | Panos | 110/345 |

FOREIGN PATENT DOCUMENTS

| 3428502A1 | 3/1985 | Germany . |
|---|---|---|
| 3903250A1 | 8/1989 | Germany . |

OTHER PUBLICATIONS

*Patent Abstracts of Japan*, vol. 8, No. 241 (C-250) 6 Nov. 1984 & JP-A-59 121 104 (Ishikawajima Harima Jukogyo) 13 Jul. 1994.

French Search Report FR 9404398–Dec. 1994.

*Primary Examiner*—Henry A. Bennett
*Assistant Examiner*—Susanne C. Tinker
*Attorney, Agent, or Firm*—Sughrue, Mion, Zinn, Macpeak & Seas

[57] ABSTRACT

A method of treating solid residue resulting from combustion of a sulfur-containing fuel in the hearth of a boiler having a circulating fluidized bed, in which method limestone is inserted into the hearth so as to make it possible to absorb the resulting sulfur dioxide in the form of calcium sulfate $CaSO_4$, the method further including the following steps:

1) prior to being inserted into the hearth, the fuel is ground down to less than 100 microns;

2) prior to being inserted into the hearth, the limestone is ground down to a grain-size centered in the range 100 microns to 150 microns, with a maximum of 1 mm;

3) at the base of the hearth, the combustion residue is collected, which residue includes lime and calcium sulfate resulting from taking up the sulfur dioxide $SO_2$ evolved by the combustion, and the residue is subjected to heat treatment in a reactor, in which both solid matter based on lime CaO, and also a gaseous mixture containing, in particular, sulfur dioxide $SO_2$ are obtained;

4) the sulfur dioxide is routed to a sulfuric acid manufacturing unit; and 5) the solid matter is quenched with water, and is then ground, these two operations reactivating the specific surface area of the solid matter, and a portion of this solid matter is re-injected into the hearth of the boiler in the form of a suspension in water, the remaining fraction of the matter being routed to a cement plant.

12 Claims, 5 Drawing Sheets

METHOD OF TREATING SOLID RESIDUE RESULTING FROM COMBUSTION OF A SULFUR-CONTAINING FUEL, AND HEAT TREATMENT APPARATUS FOR IMPLEMENTING THE METHOD

The present invention relates to combustion of sulfur-containing fuels, such as certain types of coal, or petroleum residues, in particular in boilers having circulating fluidized beds, under pressure or at atmospheric pressure.

STATE OF THE ART

In boilers having circulating fluidized beds, it is well known to take up the sulfur dioxide $SO_2$ that forms during the combustion of coal having a high sulfur content by means of lime CaO coming from limestone that has been previously inserted into the hearth.

The solid residue resulting from this type of combustion is constituted by a mixture of coal ash, of lime CaO that has not reacted, and of calcium sulfate $CaSO_4$ formed by the reaction of the lime with the sulfur dioxide.

It is difficult to find a use for the solid residue, and it is particularly difficult to find a use in cement-making because its high calcium sulfate content limits the amount that can be incorporated into a cement without degrading the characteristics of the cement.

Moreover, the amount of limestone inserted into the hearth exceeds the amount required to achieve reaction stoichiometry. Therefore, this technique produces more solid residue than does the conventional technique of scrubbing the flue gases.

It is known that the solids from a circulating-bed hearth can be ground to control their grain-size, thereby controlling the heat exchange between the solids and the wall of the hearth. In particular, this means that it is necessary only to treat very fine residue (fly ash) that passes through the boiler, instead of having to treat two types of residue, both the fly ash and residue reaching the bottom of the hearth.

Finally, to conclude the state of the art, it should be noted that alternative techniques of producing energy by gasification of coal have the characteristic of treating the synthesized gas so as to extract the sulfur-containing hydrogen $H_2S$ by scrubbing, and of treating it so as to produce recyclable products such as elemental sulfur, or sulfuric acid.

OBJECTS AND SUMMARY OF THE INVENTION

An object of the present invention is to provide a method in which the total budget of limestone injected into the hearth corresponds to a proportion that is substantially stoichiometric for the reaction with sulfur dioxide, so that the residue cannot contain surplus limestone. Another object of the invention is to reduce the amount of carbon dioxide $CO_2$ that is evolved on calcination of the limestone.

Another object of the invention is to provide a method in which it is easy to treat the combustion residue so as to produce usable by-products.

Another object of the invention is to provide a method that is suitable for being regulated automatically.

The invention provides a method of treating solid residue resulting from combustion of a sulfur-containing fuel in the hearth of a boiler having a circulating fluidized bed, in which method limestone is inserted into the hearth so as to make it possible to absorb the resulting sulfur dioxide in the form of calcium sulfate $CaSO_4$, said method further including the following steps:

1) prior to being inserted into the hearth, the fuel is ground down to less than 100 microns;
2) prior to being inserted into the hearth, the limestone is ground down to a grain-size centered in the range 100 microns to 150 microns, with a maximum of 1 mm;
3) at the base of the hearth, the combustion residue is collected, which residue includes lime and calcium sulfate resulting from taking up the sulfur dioxide $SO_2$ evolved by the combustion, and said residue is subjected to heat treatment in a reactor, in which both solid matter based on lime CaO, and also a gaseous mixture containing, in particular, sulfur dioxide $SO_2$ are obtained;
4) the sulfur dioxide is routed to a sulfuric acid manufacturing unit; and
5) the solid matter is quenched with water, and is then ground, these two operations reactivating the specific surface area of said solid matter, and a portion of this solid matter is re-injected into the hearth of the boiler in the form of a suspension in water, the remaining fraction of said matter being routed to a cement plant.

In accordance with a characteristic of the invention, the heat treatment in the reactor is performed with oxygen-enriched air.

In accordance with another characteristic of the invention, the fly ash resulting from combustion in the boiler is inserted into the reactor.

In accordance with another characteristic of the invention, the temperature of the heat treatment in the reactor lies in the range 1,100° C. to 1,400° C.

In accordance with another characteristic of the invention, the solid matter taken from the heat treatment reactor and sent to the cement plant contains less than 5% of calcium sulfate.

In accordance with another characteristic of the invention, the reactor is fed on the basis of the measured pressure in the boiler.

In accordance with another characteristic of the invention, the reactivated matter is injected into the boiler on the basis of the measured sulfur dioxide content in the flue gases from the boiler.

The invention also provides heat treatment apparatus for implementing the method, the apparatus including a boiler having a circulating fluidized bed, and receiving a sulfur-containing fuel and limestone, means for grinding the fuel down to less than 100 microns prior to inserting it into the boiler, means for grinding the limestone down to a grain-size centered on the range 100 microns to 150 microns, with a maximum of less than 1 mm, prior to inserting it into the boiler, a reactor for subjecting the residue from the boiler to heat treatment, a sulfuric acid production unit receiving the gases resulting from the heat treatment in the reactor, said reactor being associated with means for reactivating the solid matter resulting from the heat treatment in the reactor, which means comprise quenching with water and grinding, and means for routing the reactivated solid matter in part to the hearth of the boiler, and in part to a cement plant.

In a first embodiment, the reactor is a downward vertical bed reactor comprising a hearth extended at its bottom by an enclosure, the top of said hearth receiving the matter to be treated from the boiler via a first duct, and fuel and oxygen-enriched air via respective second ducts, the enclosure receiving water via a fourth duct for quenching the gaseous and solid products resulting from combustion, the enclosure being provided with a fifth duct for removing the gases resulting from the heat treatment, and with a grinder for grinding the solid matter removed via an opening at the base of the enclosure.

In a second embodiment, the reactor is of the vertical fluidized bed type comprising a combustion chamber receiving radial air flows via first ducts, an upward axial oxygen-enriched air flow via a second duct, and a fuel flow via a third duct, said first, second, and third ducts being placed at the base of said combustion chamber, said combustion chamber receiving the matter to be treated via a fourth duct, said combustion chamber being extended at its bottom by an enclosure receiving water via a fifth duct for quenching the solid matter resulting from the heat treatment, the combustion chamber being provided with a sixth duct for removing the gases resulting from the heat treatment, the enclosure including a grinder for grinding the solid matter removed via an opening at the base of the enclosure.

In a third embodiment, the reactor has a molten moving bed, and includes a combustion chamber having a sloping floor, the reactor receiving the matter to be treated at one end of the floor via a first duct connected to the base of the boiler, and receiving oxygen-enriched air, and fuel via respective second and third ducts at the top of the chamber, the gaseous products resulting from the heat treatment being removed from the combustion chamber via a fourth duct, the semi-solid matter resulting from the heat treatment overflowing into a second enclosure receiving water via a fifth duct for quenching said semi-solid matter, the second enclosure including a grinder for grinding said matter, which is removed from said enclosure via a conveyor.

In a fourth embodiment, the reactor is a rotary-kiln reactor comprising a drum having a sloping axis, receiving the matter to be treated at a first end via a first duct connected to the base of the boiler, and receiving oxygen-enriched air and a fuel via respective second and third ducts opening into the drum at the same end, the gases resulting from the heat treatment being removed from the combustion chamber via a fourth duct placed at a second end of said drum, the solid matter resulting from the heat treatment falling by gravity into second enclosure receiving water via a fifth duct for quenching said solid matter resulting from the heat treatment, the enclosure including a grinder for grinding said solid matter, which is removed from said enclosure via a conveyor.

BRIEF DESCRIPTION OF THE DRAWINGS

The invention will be well understood on reading the following description of the method and of various implementations, given with reference to the accompanying drawings, in which.

MORE DETAILED DESCRIPTION

Figure 1:
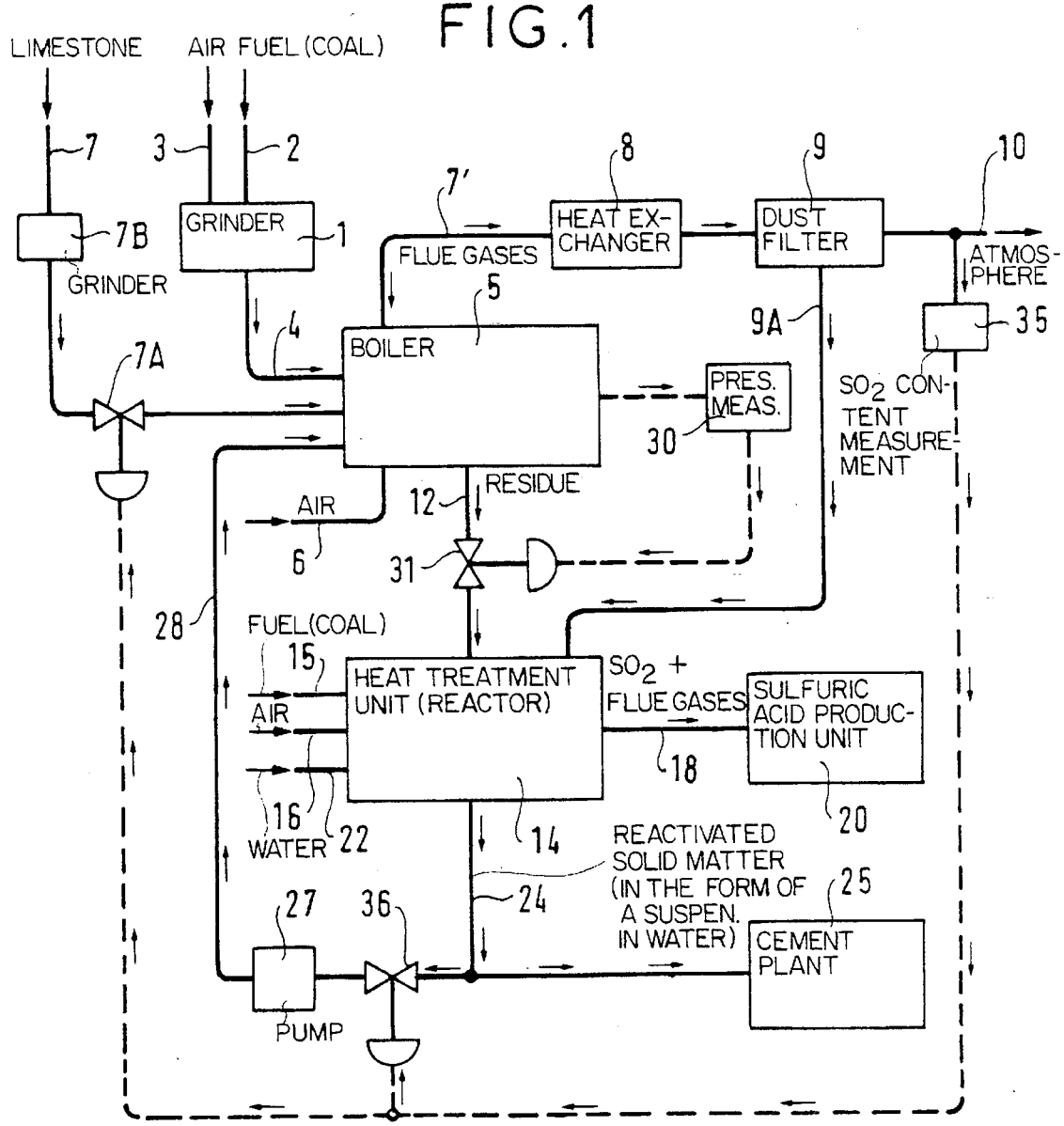
FIG. 1 is a block diagram showing the various steps of the method of the invention.

In FIG. 1, reference 1 designates a grinder receiving coal or a petroleum residue 2 that contains sulfur. Air 3 is injected into the grinder so as to convey the ground product.

In accordance with a characteristic of the invention, grinding is performed down to less than 100 microns, thereby making it possible for the inserted ash to be transformed into fly ash that is not recovered at the base of the hearth, and therefore making it possible to separate it from the absorbent material (lime) which is extracted at the bottom of the hearth and which is to be treated, regenerated, and then re-injected.

The ground product 4 is inserted into the hearth of boiler 5 having a circulating fluidized bed. Air 6, and limestone 7 is also inserted into the boiler. The limestone is ground by means of a grinding device 7B so as to give it grain-size that matches the hydrodynamic conditions, with a limited content of fine grains. Preferably, the grain-size of the limestone is centered on the range 100 microns to 150 microns, with a maximum of 1 mm.

The flue gases 7' are cooled in a heat exchanger 8 and the dust is removed from them by a dust filter 9 before they are removed into the atmosphere at 10.

The combustion residue 12 constituted by lime, by calcium sulfate, and by a small portion of coal ash, is collected at the base of the hearth at a temperature in the vicinity of 850° C., making it possible for sulfur dioxide $SO_2$ to be taken up optimally in the hearth, which acts as an $SO_2$ absorber. The residue 12 is sent to a heat treatment unit 14 fed with a fuel 15 such as coal and with air 16, optionally enriched with oxygen. The heat treatment unit also receives the dust collected in the dust filter 9, as indicated at 9A. The temperature inside the unit 14 lies in the range 1,100° C. to 1,400° C., so that the calcium sulfate $CaSO_4$ decomposes so as to give, in particular, lime CaO and sulfur dioxide $SO_2$. This gas 18, mixed with the flue gases, including nitrogen $N_2$, carbon dioxide $CO_2$, and surplus oxygen, is removed and sent to a sulfuric acid production unit 20. The document entitled "Les Techniques de l'Ingénieur" [Engineering Techniques] "J 6095" discloses an example of a sulfuric acid production unit.

The solid matter resulting from the combustion that takes place in the heat treatment unit 14 contains lime CaO and a small portion (e.g. less than 5%) of ash from the fuel, as a function of the fineness of the grinding.

Water 22 is injected into the bottom portion of the heat treatment unit 14, and the solid matter is ground.

By both quenching with water and also grinding the solid matter in this way, it is possible for the uncombined lime to be reactivated chemically. After being subjected to heat treatment, the surface of the lime is coated with a sintered layer that prevents any further chemical combination with an external medium. The quenching and grinding release new active surfaces. A portion of the resulting reactivated product 24 is sent in the form of a suspension in water, and optionally by means of a pump 27, to the boiler 5. It reacts with the sulfur dioxide evolved on combustion of the sulfur-containing fuel, as indicated above. By means of these dispositions, substantially no unused limestone remains in the combustion residue from the boiler. It can be said that the total budget of limestone injected into the hearth corresponds to a substantially stoichiometric portion for the reaction with sulfur dioxide.

The non-reinjected fraction of the solid matter 24 from the reactor 14 is routed to a cement plant 25. This poses no problems since it contains almost no calcium sulfate, with the proportion by mass being less than 5%.

The method of re-injecting into the hearth the solid matter resulting from combustion in the reactor 14 is monitored and controlled as follows:

by means of a measuring instrument 30, the pressure inside the hearth of the boiler 5 is measured; when the pressure exceeds a pre-established threshold, the solid residue is extracted from the hearth, and it is conveyed to the heat treatment unit 14; this extraction is represented in FIG. 1 by controllable valve 31; and by means of another measuring instrument 35, the sulfur dioxide $SO_2$ content in the flue gases is measured; when the measured content reaches a pre-established, threshold, the reactivated matter 24 is injected into the hearth; this injection is represented by controllable valve 36; fresh limestone can also be injected by acting on valve 7A.

Figure 2:
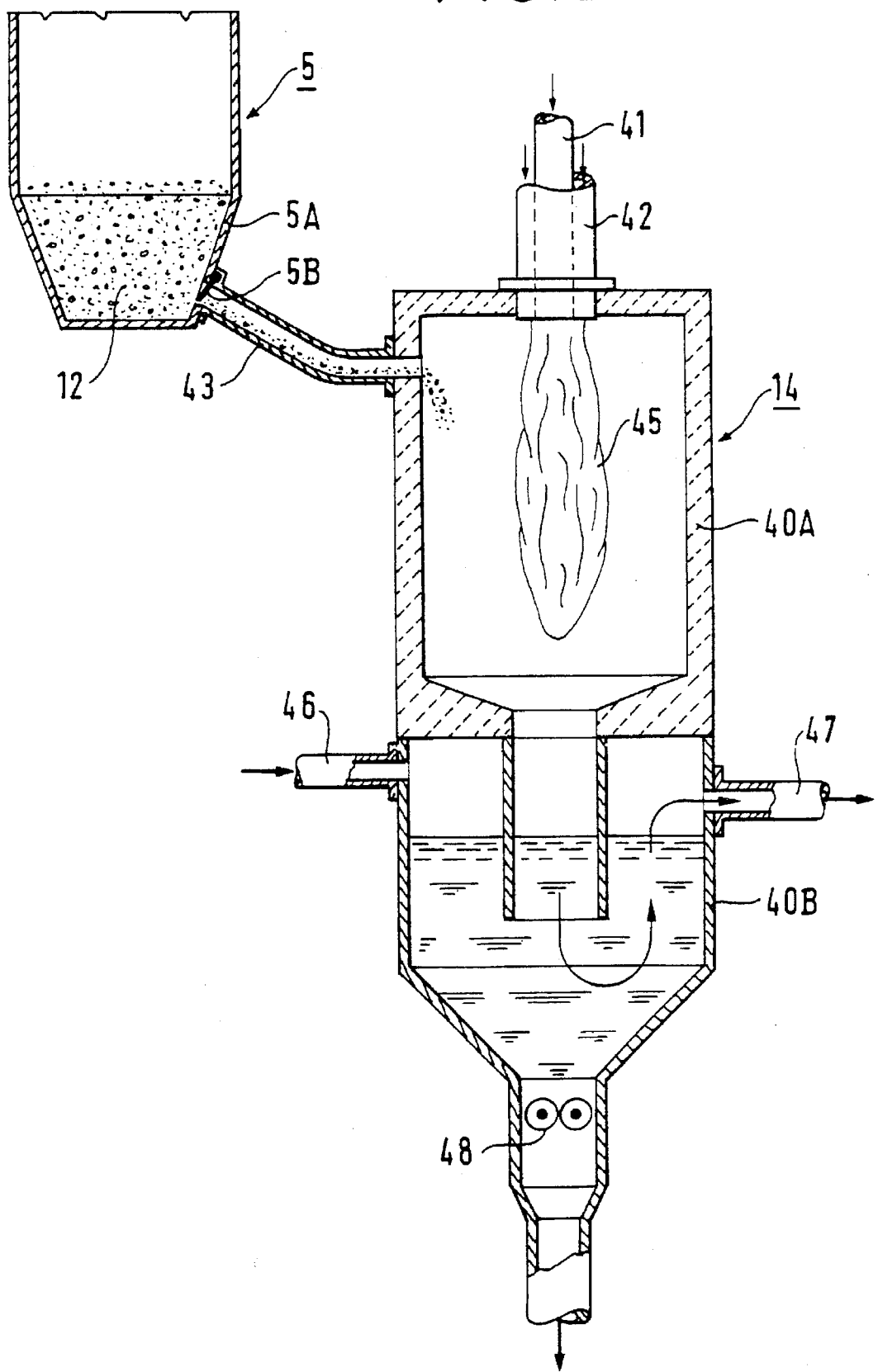
FIG. 2 is a diagram showing a first embodiment of a heat treatment unit for implementing the method.

FIG. 2 is a diagrammatic view in axial section through a first embodiment of a heat treatment unit 14 (or reactor) used at the output of the boiler for implementing the method of the invention.

The reactor 14 is of the type having a downwardly entrained vertical bed.

It includes a top hearth 40A made of a refractory material, and extended downwards by an enclosure 40B which may be made of metal.

The hearth receives air, optionally enriched with oxygen, and a fuel (e.g. coal in powder form) via respective inlet ducts 41 and 42.

The matter to be treated 12 is extracted at the base 5A of the boiler 5, and descends under gravity down a pipe 43 opening into the top portion of the hearth. A shutter device 5B enables the flow of matter 12 to be stopped. It should be noted that the fluidized-bed boiler makes it possible to retain and store at its base a large mass of combustion residue (inventory), so that the heat treatment unit for subjecting the residue to heat treatment can be fed uniformly from this buffer mass.

The combustion in the hearth 40A is represented by a flame 45.

The products resulting from the heat treatment reach the bottom portion 40B of the reactor, where they are quenched with water. For this purpose, water is sent into the reactor via a pipe 46.

After being scrubbed in the water, the gases are removed via a pipe 47 to a sulfuric acid production unit.

The solid matter that results from the heat treatment in the hearth 40A is quenched with water and is ground by a grinding device 48, so as to reactivate it, and it is then removed so that a portion of it can be re-injected into the boiler, and so that the remaining fraction can be used in a cement plant.

Figure 3:
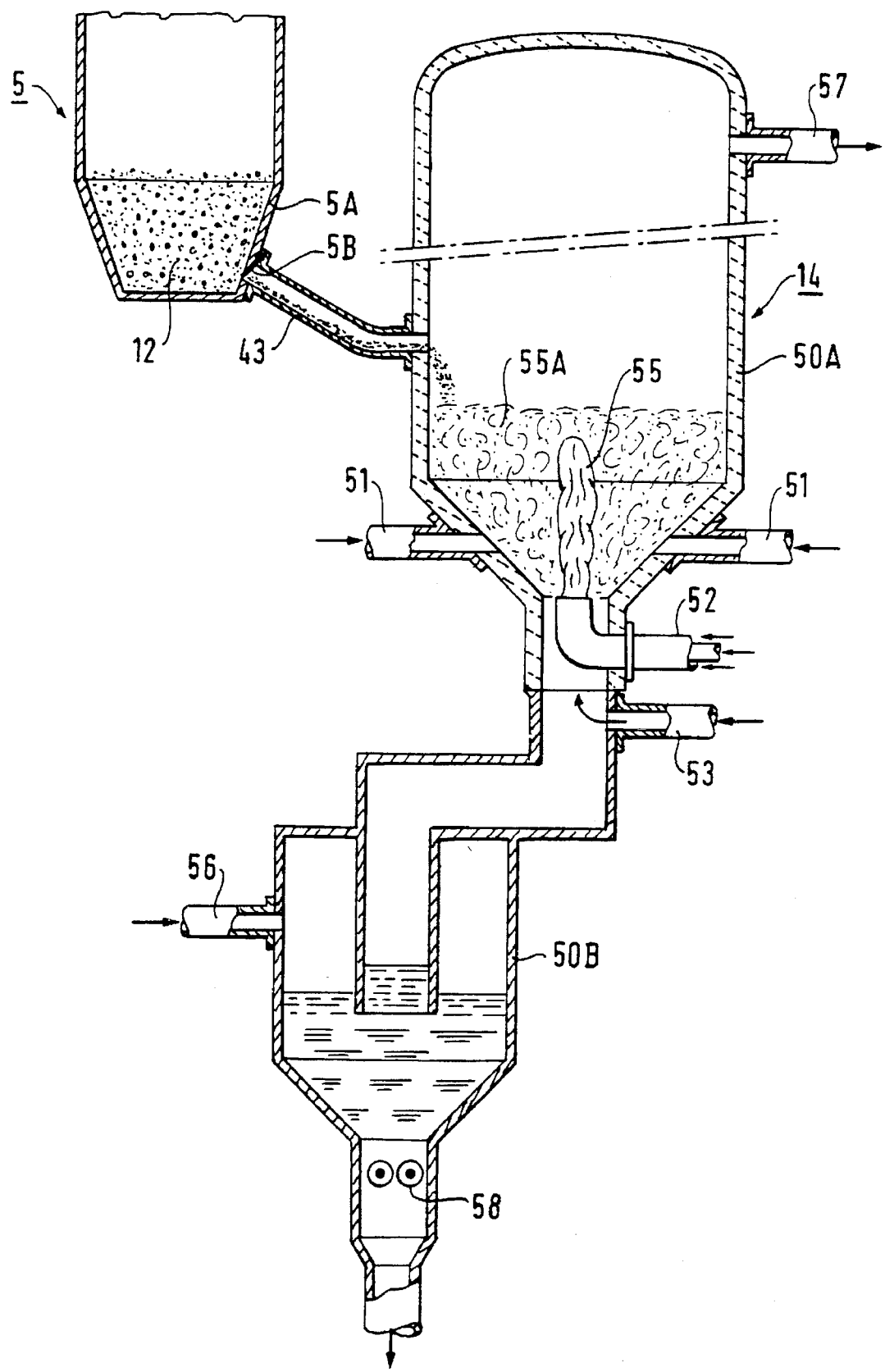
FIG. 3 is a diagram showing a second embodiment of a heat treatment unit for implementing the method.

FIG. 3 shows another embodiment of the reactor 14, which is of the type having a fluidized bed that agglomerates solids.

The reactor comprises a combustion chamber 50A extended at its bottom by an enclosure 50B.

As above, the reactor receives the product to be treated 12 via a pipe 43 connected to the base 5A of the boiler 5.

The base of the combustion chamber is provided with oxygen-enriched air inlets 51 and 52, and a fuel inlet 53 for a fuel such as coal in powder form.

Combustion is represented by a flame 55. Reference 55A designates the fluidized bed at the bottom of the chamber 50A.

The products resulting from the heat treatment flow against the stream to reach portion 50B, where they are quenched with water, by means of a water inlet 56. The gases resulting from the heat treatment are removed via pipe 57 at the top portion the chamber 50A.

The solid matter is reactivated by the water and by being ground by means of the grinder 58, and it is then removed so that a portion of it can be re-injected into the boiler, and so that the remaining fraction can be used in a cement plant.

Figure 4:
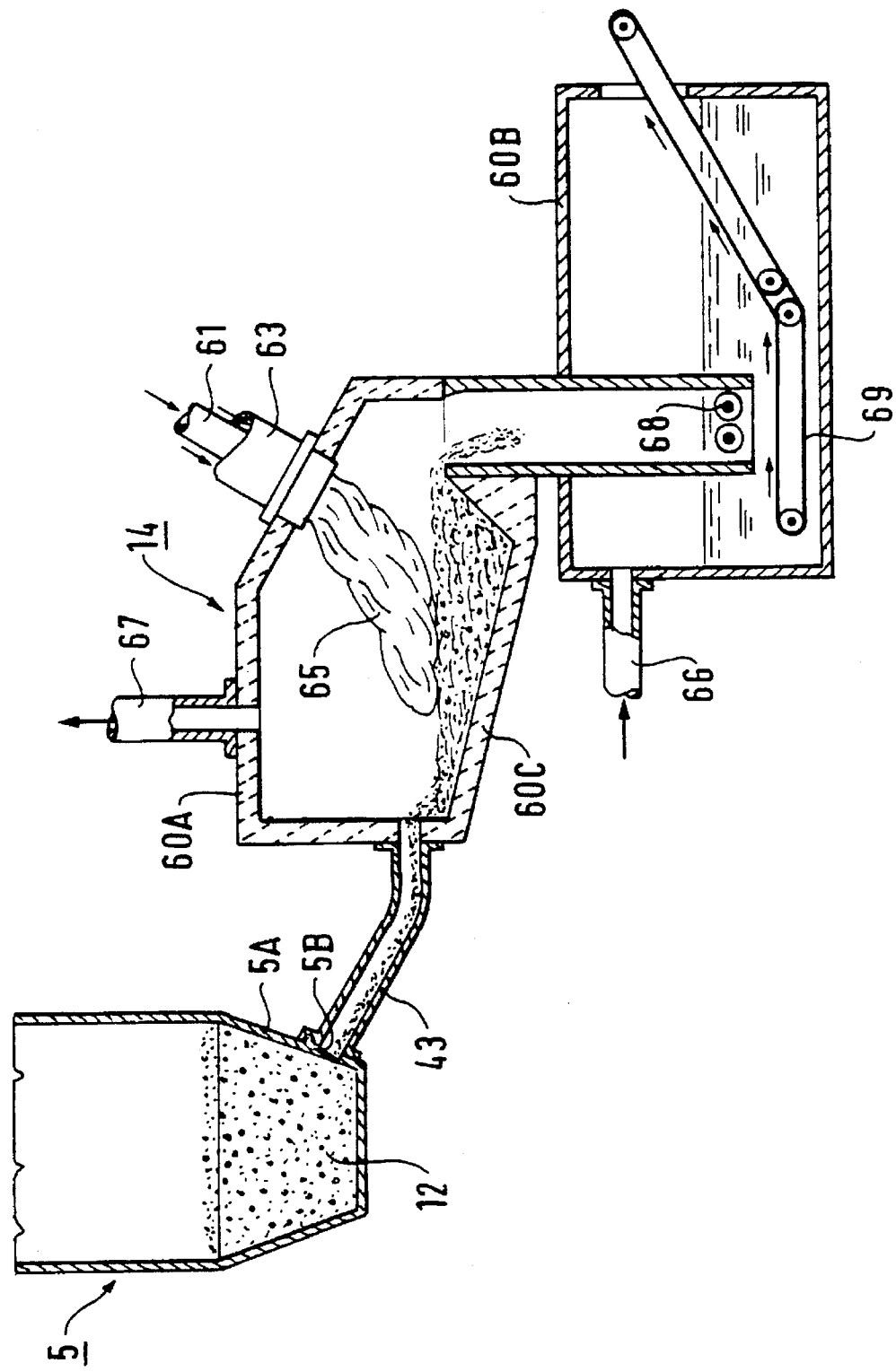
FIG. 4 is a diagram showing a third embodiment of a heat treatment unit for implementing the method.

In the embodiment shown in FIG. 4, the reactor 14 is a reactor having a molten moving bed, and including a combustion chamber 60A having a sloping floor 60C, the chamber receiving the products to be treated at one end of the floor via a duct 43 connected to the base 5A of the boiler 5, and receiving oxygen-enriched air and the fuel via respective ducts 61 and 63 at the top of the chamber 60A. Combustion is represented by a flame 65.

The gaseous products resulting from the heat treatment, in particular sulfur dioxide $SO_2$ escape at the top of the combustion chamber via a duct 67, so that they can be routed to a sulfuric acid production unit.

The semi-solid products resulting from the heat treatment overflow into an enclosure 60B where they are quenched with water fed in via an inlet duct 66, and ground by a grinder 68. The resulting reactivated solid products are extracted from the enclosure 60B, e.g. via a belt conveyor 69, and they are removed so that a portion of them can be re-injected into the boiler, and so that the remaining fraction can be used in a cement plant.

Figure 5:
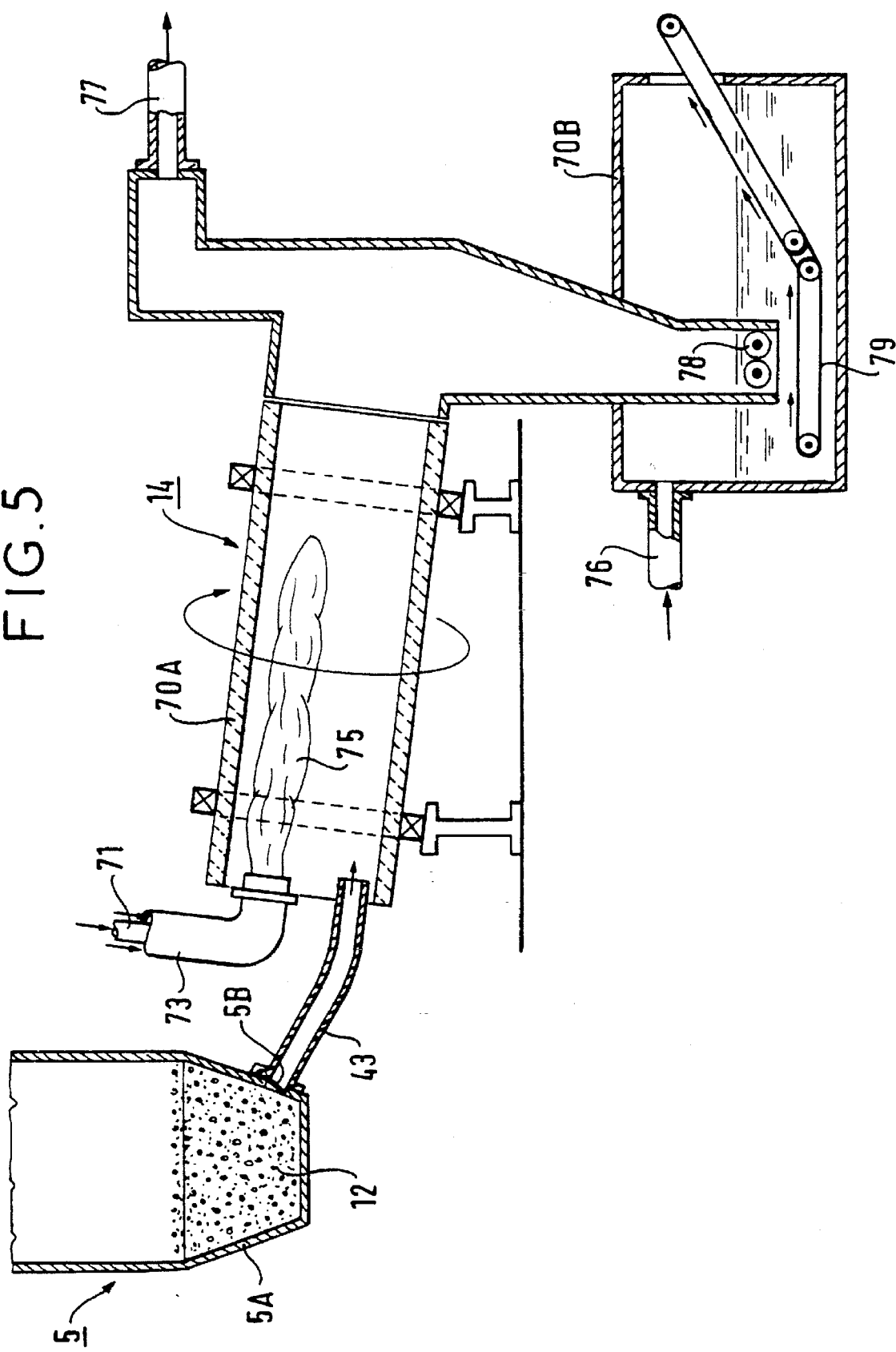
FIG. 5 is a diagram showing a fourth embodiment of a heat treatment unit for implementing the method.

In the embodiment shown in FIG. 5, the reactor is a rotary kiln comprising a cylindrical sloping drum 70A mounted to rotate about its own axis, and receiving the products to be treated at one end via a duct 43 connected to the base 5A of the boiler 5, and receiving air and fuel via respective ducts 71 and 73 at the same end combustion is represented by a flame 75.

The gaseous products resulting from the heat treatment, in particular sulfur dioxide $SO_2$, escape at the opposite end of the drum via a duct 77, so that they can be routed to a sulfuric acid production unit.

The solid products resulting from the heat treatment overflow into an enclosure 70B where they are quenched with water fed in via an inlet duct 76, and ground by a grinder 78. The resulting reactivated solid products are extracted from the enclosure 70B, e.g. via a belt conveyor 79, and they are removed so that a portion of them can be re-injected into the boiler, and so that the remaining fraction can be used in a cement plant.

The invention is not limited to the embodiments described and shown, these embodiments being given merely by way of example.

I claim:

1. A method of treating solid residue resulting from combustion of a sulfur-containing fuel in a hearth having a base of a boiler having a circulating fluidized bed, in which method limestone is inserted into said hearth so as to make it possible to absorb sulfur dioxide resulting therefrom as calcium sulfate $CaSO_4$, said method further including the following steps:

1) prior to being inserted into said hearth, the fuel is ground down to less than 100 microns;

2) prior to being inserted into said hearth, the limestone is ground down to a grain-size centered in the range of 100 microns to 150 microns, with a maximum of 1 mm;

3) at said base of said hearth, the combustion residue is collected, which residue includes lime and calcium sulfate resulting from taking up sulfur dioxide $SO_2$ evolved by the combustion, and said residue is subjected to heat treatment in a reactor, in which both solid matter based on lime CaO, and also a gaseous mixture containing, sulfur dioxide $SO_2$ are obtained;

4) the sulfur dioxide produced during said heat treatment is routed to a sulfuric acid manufacturing unit; and 5) the solid matter is quenched with water, and is then ground, these two operations reactivating the specific surface area of said solid matter, and a portion of said solid matter is re-injected into said hearth of said boiler as a suspension in water, a remaining fraction of said solid matter being routed to a cement plant.

2. A method according to claim 1, wherein the heat treatment in the reactor is performed with oxygen-enriched air.

3. A method according to claim 1, wherein fly ash resulting from combustion in said boiler is inserted into said reactor.

4. A method according to claim 1, wherein the temperature of the heat treatment in the reactor lies in the range 1,100° C. to 1,400° C.

5. A method according to claim 1, wherein the solid matter taken from the heat treatment reactor and sent to the cement plant contains less than 5% of calcium sulfate.

6. A method according to claim 1, wherein said reactor is fed based on a measured pressure in the boiler.

7. A method according to claim 1, wherein the reactivated matter is injected into the boiler based on a measured sulfur dioxide content in flue gases from the boiler.

8. Heat treatment apparatus for implementing the method according to claim 1, said apparatus including a boiler having a circulating fluidized bed, and receiving a sulfur-containing fuel and limestone, means for grinding the fuel down to less than 100 microns prior to inserting it into the boiler, means for grinding the limestone down to a grain-size centered on the range 100 microns to 150 microns, with a maximum of less than 1 mm, prior to inserting it into the boiler, a reactor for subjecting the residue from the boiler to heat treatment, a sulfuric acid production unit receiving gases resulting from the heat treatment in said reactor, said reactor being associated with means for reactivating the solid matter resulting from the heat treatment in the reactor, which means comprise quenching with water and grinding, and means for routing the reactivated solid matter in part to said hearth of said boiler, and in part to a cement plant.

9. Heat treatment apparatus according to claim 8, wherein said reactor is a downward vertical bed reactor comprising a hearth extended at its bottom by an enclosure, the top of said hearth receiving the matter to be treated from the boiler via a first duct, and fuel and oxygen-enriched air via respective second ducts, the enclosure receiving water via a fourth duct for quenching gaseous and solid products resulting from combustion, said enclosure being provided with a fifth duct for removing the gases resulting from the heat treatment, and with a grinder for grinding the solid matter removed via an opening at the base of the enclosure.

10. Heat treatment apparatus according to claim 8, wherein said reactor is of a vertical fluidized bed type comprising a combustion chamber receiving radial air flows via first ducts, an upward axial oxygen-enriched air flow via a second duct, and a fuel flow via a third duct, said first, second, and third ducts being placed at the base of said combustion chamber, said combustion chamber receiving the matter to be treated via a fourth duct, said combustion chamber being extended at its bottom by an enclosure receiving water via a fifth duct for quenching the solid matter resulting from the heat treatment, said combustion chamber being provided with a sixth duct for removing the gases resulting from said heat treatment, said enclosure including a grinder for grinding the solid matter removed via an opening at the base of said enclosure.

11. Heat treatment apparatus according to claim 8, wherein the reactor is a reactor having a molten moving bed, and includes a combustion chamber having a sloping floor, the reactor receiving the matter to be treated at one end of the floor via a first duct connected to the base of the boiler, and receiving oxygen-enriched air, and fuel via respective second and third ducts at the top of said combustion chamber, the gaseous products resulting from said heat treatment being removed from said combustion chamber via a fourth duct, the semi-solid matter resulting from said heat treatment overflowing into a second enclosure receiving water via a fifth duct for quenching said semi-solid matter, said second enclosure including a grinder for grinding said semi-solid matter, which is removed from said second enclosure via a conveyor.

12. Heat treatment apparatus according to claim 8, wherein the reactor is a rotary-kiln reactor comprising a drum having a sloping axis, receiving the matter to be treated at a first end via a first duct connected to the base of the boiler, and receiving oxygen-enriched air and a fuel via respective second and third ducts opening into the drum at the same end, gases resulting from the heat treatment being removed from said combustion chamber via a fourth duct placed at a second end of said drum, said solid matter resulting from said heat treatment falling by gravity into a second enclosure receiving water via a fifth duct for quenching said solid matter resulting from the heat treatment, said enclosure including a grinder for grinding said solid matter, which is removed from said enclosure via a conveyor.

* * * * *